(12) United States Patent
Min

(10) Patent No.: US 6,899,082 B2
(45) Date of Patent: May 31, 2005

(54) METHOD AND SYSTEM FOR CONTROLLING ENGINE IGNITION TIMING

(75) Inventor: Kohn Min, Yongin (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/327,818

(22) Filed: Dec. 19, 2002

(65) Prior Publication Data

US 2003/0150424 A1 Aug. 14, 2003

(30) Foreign Application Priority Data

Feb. 8, 2002 (KR) .................................. 2002-0007337

(51) Int. Cl.⁷ .............................................. F02P 5/152
(52) U.S. Cl. ........................... 123/406.33; 123/406.53; 123/406.55
(58) Field of Search ........................ 123/339.1, 339.11, 123/406.29, 406.33, 406.46, 406.49, 406.5, 406.53, 406.55; 701/110, 111, 113, 115; 73/117.3, 118.1; 477/109, 111

(56) References Cited

U.S. PATENT DOCUMENTS

| | | | | |
|---|---|---|---|---|
| 4,805,574 A | * | 2/1989 | Sakamoto et al. | 123/406.55 |
| 5,016,590 A | * | 5/1991 | Ohkumo | 123/406.49 |
| 5,542,389 A | * | 8/1996 | Miyamoto et al. | 123/339.1 |
| 5,727,522 A | | 3/1998 | Otani et al. | |
| 6,240,774 B1 | * | 6/2001 | Niki et al. | 73/118.1 |

FOREIGN PATENT DOCUMENTS

| | | |
|---|---|---|
| DE | 3743406 | 7/1988 |
| DE | 3838022 | 5/1989 |
| DE | 19712552 | 11/1997 |
| DE | 69413194 | 2/1999 |
| DE | 10026756 | 12/2001 |
| DE | 10043694 | 3/2002 |
| JP | 01063654 A * | 3/1989 |
| KR | 100302764 | 5/2001 |

* cited by examiner

*Primary Examiner*—Willis R. Wolfe, Jr.
(74) *Attorney, Agent, or Firm*—Morgan Lewis & Bockius LLP

(57) ABSTRACT

The ignition timing control system for an internal combustion engine includes an ignition device and a control unit. The control unit is programmed to execute steps including: determining if a predetermined condition for ignition timing retardation control; calculating a basic ignition timing value based on a knocking learning value, an engine speed, an intake air pressure, and an intake air temperature, if it is determined that the predetermined condition exists; calculating an ignition timing retardation value based on engine speed and intake air pressure; calculating an ignition timing retardation coefficient based on engine coolant temperature; calculating a final ignition timing value based on the basic ignition timing value, the ignition timing retardation value, and the ignition retardation coefficient; and controlling ignition timing according to the final ignition timing value.

17 Claims, 1 Drawing Sheet

METHOD AND SYSTEM FOR CONTROLLING ENGINE IGNITION TIMING

FIELD OF THE INVENTION

The present invention relates to an engine ignition timing control method and system, and more particularly, to a method in which ignition timing is retarded in order to reduce exhaust emissions at a low engine temperature.

BACKGROUND OF THE INVENTION

Generally, in a spark-ignition internal combustion engine, in order to increase engine output torque or reduce exhaust emissions, ignition timing is controlled based on various vehicle operating conditions such as engine speed engine load, etc.

A problem with corner ignition timing control methods is that the ignition timing value in an idle state or a partial load state during a predetermined period after starting of the engine is determined near a minimum spark advance for best torque value (MBT) without considering the coolant temperature.

Accordingly, if the coolant temperature is low, its temperature increases slowly, and a relatively long period expires before the temperature of the emission gas reaches a light off temperature where an operational efficiency of a catalytic converter is maximized. Thus, a large amount of emission gas is exhausted before reaching the light off temperature.

SUMMARY OF THE INVENTION

In a preferred embodiment of the present invention, an ignition timing control method includes determining if conditions exist for ignition retardation control. A basic ignition timing value is then calculated if it is determined that those conditions exist. An ignition timing retardation value, an ignition retardation coefficient based on a coolant temperature are calculated. Also, a final ignition timing value based on the basic ignition timing value, the ignition timing retardation value, and the ignition retardation coefficient.

It is preferable that the determining includes detecting one or more vehicle operating conditions, comparing the detected vehicle operating conditions to predetermined values. The determining also preferably includes determining if the predetermined conditions for the ignition retardation control exist based on said comparing.

Preferably, the vehicle operating conditions comprise at least one of a period of time after engine starting, an engine speed, an engine load state, a shift range, and a coolant temperature.

It is also preferably determined that the conditions for ignition retardation control exist if the period of time after engine starting is larger than a predetermined value, the engine speed is higher than a predetermined speed, the engine load state is a predetermined state, the shift range is a predetermined shift range, and the coolant temperature is within a predetermined range.

It is further preferable that it is determined that the conditions for ignition retardation control exist if the engine load state is an idle state or a partial load state, and the predetermined shift range is a neutral range. Preferably, the shift range is detected by an inhibitor switch.

It is further preferable that the basic ignition timing value is calculated based on a knocking learning value, an ignition timing value according to an engine speed and an intake air pressure, and an ignition timing value according to an intake air temperature. Still further, it is preferable that the ignition timing value according to the engine speed and the intake air pressure is determined from a predetermined map. Also, the basic ignition timing value is preferably calculated according to the following equation:

$$\theta_{base} = K\_kn1 * \theta(N_e, P_b) + \theta(AT)$$

where $\theta_{base}$ is the basic ignition timing value, $K\_kn1$ is the knocking learning value, $\theta(N_e, P_b)$ is the ignition timing value according to the engine speed and the intake air pressure, and $\theta(AT)$ is the ignition timing value according to the intake air temperature. It is preferable that the ignition timing retardation value is calculated based on the engine speed and the intake air pressure. The ignition retardation coefficient is preferably determined to be inversely proportional to the engine coolant temperature.

It is preferable that the final ignition timing value is determined by the following equation:

$$\theta = \min[(K_{WT} * \theta_{rtd} + (1 - K_{WT}) * \theta_{base}), \theta_{base}]$$

where $\theta$ is the final ignition timing value, $K_{WT}$ is the ignition retardation coefficient, $\theta_{rtd}$ is the ignition timing retardation value, $\theta_{base}$ is the basic ignition timing value, and "min" is a function to select a smaller value.

In an alternative preferred embodiment of the present invention, the ignition timing control method for an internal combustion engine includes determining if predetermined conditions for ignition retardation control exist, calculating a basic ignition timing value based on a knocking learning value, an engine speed, an intake air pressure, and an intake air temperature, if it is determined that the predetermined conditions exist. An ignition timing retardation value, based on an engine speed and an intake air pressure, an ignition retardation coefficient based on an engine coolant temperature are calculated. Also calculated are a final ignition timing value based on the basic ignition timing value, the ignition timing retardation value, and the ignition retardation coefficient. Ignition timing is controlled according to the final ignition timing value.

It is preferable that it is determined that the predetermined condition for ignition timing retardation control exists if the period of time after engine starting is larger than a predetermined value, the engine speed is higher than a predetermined speed, the mode of engine load is a predetermined mode, the shift range is a predetermined shift range, and the coolant temperature is within a predetermined range.

It is further preferable that the final ignition timing value is calculated according to the following equation:

$$\theta = \min[(K_{WT} * \theta_{rtd} + (1 - K_{WT}) * \theta_{base}), \theta_{base}]$$

where $\theta$ is the final ignition timing value, $K_{WT}$ is the ignition retardation coefficient, $\theta_{rtd}$ is the ignition timing retardation value, $\theta_{base}$ is the basic ignition timing value, and "min" is a function to select a smaller value.

In another preferred embodiment of the present invention, the ignition timing control system comprises an ignition device and a control unit. The control unit receives signals of one or more vehicle operating conditions, determines an ignition timing value based on the vehicle operating conditions, and outputs a signal representative of the determined ignition timing value to the ignition device. The control unit is programmed to execute control steps including determining if a predetermined condition for ignition timing retardation control exists, calculating a basic ignition timing value based on a knocking learning value, an engine speed, an intake air pressure, and an intake air temperature, if it is determined that the predetermined condition exists.

An ignition timing retardation value, based on an engine speed and an intake air pressure, an ignition retardation coefficient based on an engine coolant temperature are also calculated. Furthermore, a final ignition timing value is calculated based on the basic ignition timing value, the ignition timing retardation value, and the ignition retardation coefficient. Ignition timing is then controlled based on the final ignition timing value. It is preferable that it is determined that the predetermined condition for the ignition retardation control exists if the engine coolant temperature is within a predetermined range.

Preferably, the final ignition timing value is determined according to the following equation:

$$\theta = \min[(K_{WT} * \theta_{rtd} + (1-K_{WT}) * \theta_{base}), \theta_{base}]$$

where $\theta$ is the final ignition timing value, $K_{WT}$ is the ignition retardation coefficient, $\theta_{rtd}$ is the ignition timing retardation value, $\theta_{base}$ is the basic ignition timing value, and "min" is a function to select a smaller value.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
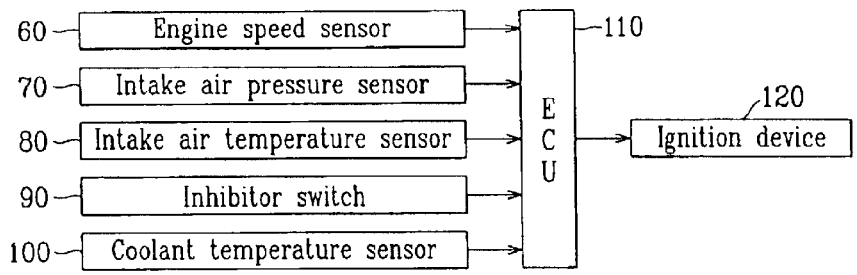
FIG. 1 is a schematic block diagram showing an ignition timing control system according to the preferred embodiment of the present invention.

As shown in FIG. 1, an ignition timing control system according to the preferred embodiment of the present invention includes an engine speed sensor 60 for detecting an engine speed; an intake air pressure sensor 70 for detecting the pressure inside an intake manifold; an intake air temperature sensor 80 for detecting the temperature of the intake air; an inhibitor switch 90 for detecting a current shift range; and a coolant temperature sensor 100 for detecting the coolant temperature. It should be appreciated that other suitable sensors and switches may be devised by persons skilled in the art.

The ignition timing control system according to the preferred embodiment of the present invention further comprises an electronic control unit (hereinafter referred to as an ECU) 110, which receives signals indicative of vehicle operating conditions from the sensors and switches and determines an ignition timing value based on the received signals. The ECU 110 then generates an ignition signal.

The ignition timing control system according to the preferred embodiment of the present invention further comprises an ignition device 120, which ignites an air/fuel mixture in a combustion chamber according to an ignition signal received from the ECU 110.

The ECU 110 preferably includes a processor, a memory, and other necessary hardware and software components, as will be understood by persons skilled in the art, to permit the ECU 110 to communicate with the sensors and execute the control functions as described herein.

As stated above, the ECU 110 determines the ignition timing value based on the engine speed and the engine load, and the ignition timing value is preferably determined to be near the MBT in order to maximize the engine output.

In the present invention, the ignition timing is normally controlled to be the MBT. However, if predetermined conditions exist, the ignition timing is retarded by a predetermined value. These conditions require the engine coolant temperature to be in a predetermined range, and the shift range to be in a neutral N range. If these conditions exist, the ECU 110 calculates the ignition timing value based on the engine speed, the intake air pressure, and the intake air temperature. Then, if the engine speed and the intake air pressure are each in predetermined ranges, the ECU 110 retards the ignition timing, and after a predetermined period of time, the ignition timing value is determined to be near the MBT.

Figure 2:
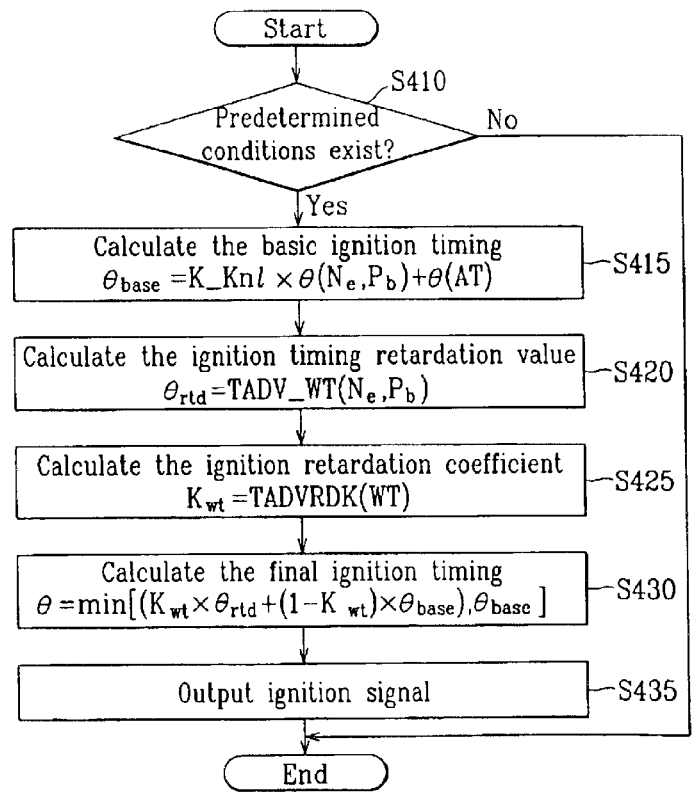
FIG. 2 is a flowchart of an ignition timing control method according to the preferred embodiment of the present invention.

As shown in FIG. 2, at first, the ECU 110 determines if conditions for ignition timing control exist at step S410. These conditions require that a predetermined period of time has elapsed after starting of an engine, and that the engine speed is higher than a predetermined speed. The predetermined time after starting of the engine is the time needed for the engine to idle stably after starting the engine, such as three seconds. The predetermined engine speed is a target engine idle speed, and is determined based on coolant temperature. For example, the predetermined speed may be set to 1273 rpm when the coolant temperature is 20° C., and as 1148 rpm when the coolant temperature is 34° C. If these conditions exist, the engine may be considered to be operating normally. In general, a person of ordinary skill in the art may select appropriate conditions for triggering timing control based on the teachings of the present invention and the operating requirements of a particular engine. For example, if an engine speed reaches 400–500 rpm after 3–4 seconds from starting of the engine, the engine may be considered to be operating normally.

The conditions further require that the engine is in an idle state or a partial load state. The engine load state is preferably determined based on a throttle valve position and an intake manifold pressure. The conditions further require that the current shift range is neutral. The shift range may be detected by an inhibitor switch, and accordingly, a conventional inhibitor switch may be used.

If the ignition timing is retarded in a driving D range, the retardation of ignition timing causes negative effects on engine operations. That is, in the driving range, sufficient power must be generated in order to drive the vehicle, so it is preferable that the ignition timing is controlled to be at or near the MBT.

The conditions further require that the coolant temperature is in a predetermined range. For example, the predetermined range may be set as 20–34° C.

If it is determined that the conditions exist at step S410, the ECU 110 calculates a basic ignition timing value θ base according to the following Equation 1.

$$\theta_{base} = K\_knl * \theta(N_e, P_b) + \theta(AT) \qquad \text{[Equation 1]}$$

where K_knl is a knocking learning value, which is determined according to whether knocking occurs or not in the idle state or the partial load state after starting of the engine; $\theta(N_e, P_b)$ is an ignition timing value according to the engine speed $N_e$ and the intake air pressure $P_b$, which is determined from ignition timing map data stored in the ECU's memory; and $\theta(AT)$ is an ignition timing value according to the intake air temperature AT. K_kn1 is set as a value between 0.5 and 1. If there is no knocking, K-knl is set as 1, and if there is knocking, K_kn1 is preferably decreased. Also in a preferred embodiment, $\theta(N_e, P_b)$ is determined from a predetermined look-up table. The value of $\theta(N_e, P_b)$ is preferably determined as a value for best torque, that is, as a MBT.

The ECU 110 then calculates an ignition timing retardation value $\theta$ rtd according to the following Equation 2 at step S420.

$$\theta_{rtd} = TADV\_WT(N_e, P_b) \quad \text{[Equation 2]}$$

where $TADV\_WT(N_e, P_b)$ is an ignition timing retardation value at the specific engine speed $N_e$ and the intake air pressure $P_b$. It is preferable that the ignition retardation value is determined from a predetermined look-up table, which is acquired from experimentation. The value may preferably be determined such that a temperature of emission gas is within a desired range.

The ECU 110 then calculates an ignition retardation coefficient KWT according to the following Equation 3 at step S425.

$$K_{WT} = TADVRDK(WT) \quad \text{[Equation 3]}$$

The retarding coefficient is preferably determined based on a coolant temperature WT.

The ignition timing retardation value is determined in proportion to the ignition retardation coefficient. The necessity of retardation of the ignition timing increases as the coolant temperature decreases, so it is preferable that the ignition retardation coefficient becomes larger as the coolant temperature becomes lower.

The ECU 110 then calculates a final ignition timing value $\theta$ according to the following Equation 4 at step S430.

$$\theta = \min[(K_{WT} * \theta_{rtd} + (1 - K_{WT}) * \theta_{base}), \theta_{base}] \quad \text{[Equation 4]}$$

where $\theta$ is the final ignition timing value, $K_{WT}$ is the ignition retardation coefficient, $\theta_{rtd}$ is the ignition timing retardation value, $\theta_{base}$ is the basic ignition timing value, and "min" is a function to select the smaller value.

Consequently, as is known from Equation 4, if the ignition timing retardation value $\theta_{rtd}$ is less than the basic ignition timing value $\theta_{base}$, the ignition timing is retarded from the basic ignition timing value; and if the ignition timing retardation value $\theta_{rtd}$ is greater than the basic ignition timing value $\theta_{base}$, the final ignition timing value is determined to be equal to the basic ignition timing value.

The ECU 110 generates an ignition signal corresponding to the final ignition timing value determined in step S430 and outputs the ignition signal to the ignition device 120 at step S435.

According to the ignition timing control method of the present invention, the ignition timing is retarded at a low coolant temperature, so it takes a shorter period of time to reach the light off temperature. Consequently, exhaust emissions are substantially reduced.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An ignition timing control method for an internal combustion engine, comprising:

determining if conditions for ignition retardation control exist;

calculating a basic ignition timing value based on a knocking learning value, an ignition timing value according to an engine speed and an intake air pressure, and an ignition timing value according to an intake air temperature, if it is determined that the conditions exist;

calculating an ignition timing retardation value;

calculating an ignition retardation coefficient based on a coolant temperature; and calculating a final ignition timing value based on the basic ignition timing value, the ignition timing retardation value, and the ignition retardation coefficient.

2. The method of claim 1, wherein said determining comprises:

detecting one or more vehicle operating conditions;

comparing the detected vehicle operating conditions to predetermined values; and determining if the conditions for the ignition retardation control exist based on said comparing.

3. The method of claim 2, wherein the vehicle operating conditions comprise at least one of a period of time after engine starting, an engine speed, an engine load state, a shift range, and a coolant temperature.

4. The method of claim 1, wherein it is determined that the conditions for ignition retardation control exist if the period of time after engine starting is larger than a predetermined value, the engine speed is higher than a predetermined speed, the engine load state is a predetermined state, the shift range is a predetermined shift range, and the coolant temperature is within a predetermined range.

5. The method of claim 4, wherein the predetermined engine load state is an idle state or a partial load state, and the predetermined shift range is a neutral range.

6. The method of claim 5, wherein the shift range is detected by an inhibitor switch.

7. The method of claim 1, wherein the ignition timing value according to the engine speed and the intake air pressure is determined by a predetermined ignition timing map.

8. The method of claim 1, wherein the basic ignition timing value is calculated according to the following equation:

$$\theta_{base} = K\_knl * \theta(N_e, P_b) + \theta(AT)$$

where $\theta_{base}$ is the basic ignition timing value, K_kn1 is a knocking learning value, $\theta(N_e, P_b)$ is an ignition timing value according to an engine speed and an intake air pressure, and $\theta(AT)$ is an ignition timing value according to an intake air temperature.

9. The method of claim 1, wherein the ignition timing retardation value is calculated based on an engine speed and an intake air pressure.

10. The method of claim 1, wherein the ignition retardation coefficient is determined to be inversely proportional to an engine coolant temperature.

11. The method of claim 1, wherein the final ignition timing value is determined by the following equation:

$$\theta = \min[(K_{WT} * \theta_{rtd} + (1-K_{WT}) * \theta_{base}), \theta_{base}]$$

where $\theta$ is the final ignition timing value, $K_{WT}$ is the ignition retardation coefficient, $\theta_{rtd}$ is the ignition timing retardation value, $\theta_{base}$ is the basic ignition timing value, and "min" is a function to select a smaller value.

12. An ignition timing control method for an internal combustion engine, comprising:

determining if predetermined conditions for ignition retardation control exist;

calculating a basic ignition timing value based on a knocking learning value, an engine speed, an intake air pressure, and an intake air temperature, if it is determined that the predetermined conditions exist;

calculating an ignition timing retardation value based on an engine speed and an intake air pressure;

calculating an ignition retardation coefficient based on an engine coolant temperature;

calculating a final ignition timing value based on the basic ignition timing value, the ignition timing retardation value, and the ignition retardation coefficient; and controlling ignition timing according to the final ignition timing value.

13. The method of claim 12, wherein it is determined that the predetermined condition for ignition timing retardation control exists if the period of time after engine starting is larger than a predetermined value, the engine speed is higher than a predetermined speed, the mode of engine load is a predetermined mode, the shift range is a predetermined shift range, and the coolant temperature is within a predetermined range.

14. The method of claim 12, wherein the final ignition timing value is calculated according to the following equation:

$$\theta = \min[(K_{WT} * \theta_{rtd} + (1-K_{WT}) * \theta_{base}), \theta_{base}]$$

where $\theta$ is the final ignition timing value, $K_{WT}$ is the ignition retardation coefficient, $\theta_{rtd}$ is the ignition timing retardation value, $\theta_{base}$ is the basic ignition timing value, and "min" is a function to select a smaller value.

15. An ignition timing control system for an internal combustion engine, comprising:

an ignition device; and a control unit configured for: receiving inputs of one or more vehicle operating conditions, determining an ignition timing value based on the vehicle operating conditions, and outputting a signal representative of the determined ignition timing value to the ignition device, where the control unit is programmed to execute steps comprising:

determining if a predetermined condition for ignition timing retardation control exists;

calculating a basic ignition timing value based on a knocking learning value, an engine speed, an intake air pressure, and an intake air temperature, if it is determined that the predetermined condition exist;

calculating an ignition timing retardation value based on an engine speed and an intake air pressure;

calculating an ignition retardation coefficient based on an engine coolant temperature;

calculating a final ignition timing value based on the basic ignition timing value, the ignition timing retardation value, and the ignition retardation coefficient; and controlling ignition timing according to the final ignition timing value.

16. The system of claim 15, wherein it is determined that the predetermined condition for the ignition retardation control exists if the engine coolant temperature is within a predetermined range.

17. The system of claim 15, wherein the final ignition timing value is determined according to the following equation:

$$\theta = \min[(K_{WT} * \theta_{rtd} + (1-K_{WT}) * \theta_{base}), \theta_{base}]$$

where $\theta$ is the final ignition timing value, $K_{WT}$ is the ignition retardation coefficient, $\theta_{rtd}$ is the ignition timing retardation value, $\theta_{base}$ is the basic ignition timing value, and "min" is a function to select a smaller value.

* * * * *